United States Patent [19]

Sharod

[11] Patent Number: 4,579,384

[45] Date of Patent: Apr. 1, 1986

[54] ARMREST LOCK FOR A MOTOR CAR

[75] Inventor: Sidney J. Sharod, Thundersley, United Kingdom

[73] Assignee: Ford Motor Company, Dearborn, Mich.

[21] Appl. No.: 531,308

[22] Filed: Sep. 12, 1983

[30] Foreign Application Priority Data

Sep. 22, 1982 [GB] United Kingdom ............... 8227011

[51] Int. Cl.⁴ ............................................. A47C 7/54
[52] U.S. Cl. ................... 297/113; 297/379; 297/417
[58] Field of Search ............ 297/417, 411, 112, 113, 297/379, 115, 116, 117

[56] References Cited

U.S. PATENT DOCUMENTS

| 2,714,419 | 8/1955 | Killington | 297/113 |
| 2,732,003 | 1/1956 | Williams | 297/379 |
| 2,737,229 | 3/1956 | Semar | 297/379 |
| 2,864,432 | 12/1958 | Limberg | 297/379 |
| 2,873,794 | 2/1959 | Leslie et al. | 297/379 |
| 3,666,319 | 5/1972 | Moloney, Jr. | 297/113 |
| 4,435,011 | 3/1984 | Hakamata | 297/113 |

FOREIGN PATENT DOCUMENTS 284491 2/1928 United Kingdom ............... 297/113

Primary Examiner—William E. Lyddane
Assistant Examiner—Mark W. Binder
Attorney, Agent, or Firm—Clifford L. Sadler; Daniel M. Stock

[57] ABSTRACT

An armrest lock has a pivoted latch which swings into an active locking position as a result of its own inertia, in the event of a crash, to keep the armrest locked in its raised position. The latch then engages with a projecting rib on the linkage which supports the armrest and locks movement of the linkage.

1 Claim, 3 Drawing Figures

ARMREST LOCK FOR A MOTOR CAR

BACKGROUND OF THE INVENTION

This invention relates to an armrest lock for a motor car for locking an armrest in its raised position in the event of sudden deceleration as in a crash.

Many motor cars have armrests which can be swung between raised and lowered positions, according to the requirements of the passengers. When such an armrest is in its raised position, it is desirable to be able to prevent it dropping to its lowered position in the event of a crash. Should it drop in this manner, there is a possibility of danger to the passengers sitting adjacent the armrest. Some sort of lock for motor car armrest is now required to meet homologation requirements.

Known armrest locks require release before the armrest can be lowered. However, such a system requires that the potential user of the armrest be acquainted with the manner of operation so as to be able to lower the armrest, and rear seat passengers, for whom armrests are most frequently provided, do not have access to an instruction manual or the inclination to embark on investigation as to how to release the lock which allows the armrest to be lowered.

SUMMARY OF THE INVENTION

According to this invention, there is provided an armrest lock for locking, in its raised position, an armrest which may be raised or lowered on a linkage, the lock comprising a latch pivotally mounted so that its own inertia causes it to come into engagement with a detent on the linkage, in order to lock the armrest in the event of a sudden deceleration of the vehicle.

The latch is preferably pivotably mounted on the fixed part of the armrest movement linkage, and is surrounded by a cage which ensures that pivoting movement of the latch is not hindered, by keeping adjacent upholstery out of contact with the latch.

The latch preferably has a radially extending arm with a lateral tooth projecting at one end which is adapted to engage with a detent in the form of a rib on a part of the armrest linkage, to prevent movement of the linkage. The rib on the linkage may, in the lowered position of the armrest, serve as an abutment for an armrest support.

To prevent the tooth and the rib from being distorted and coming out of engagement with one another under the large force which is exerted on the armrest in a crash, their mating surfaces may be mutually shaped so that any tendency toward distortion is minimized.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
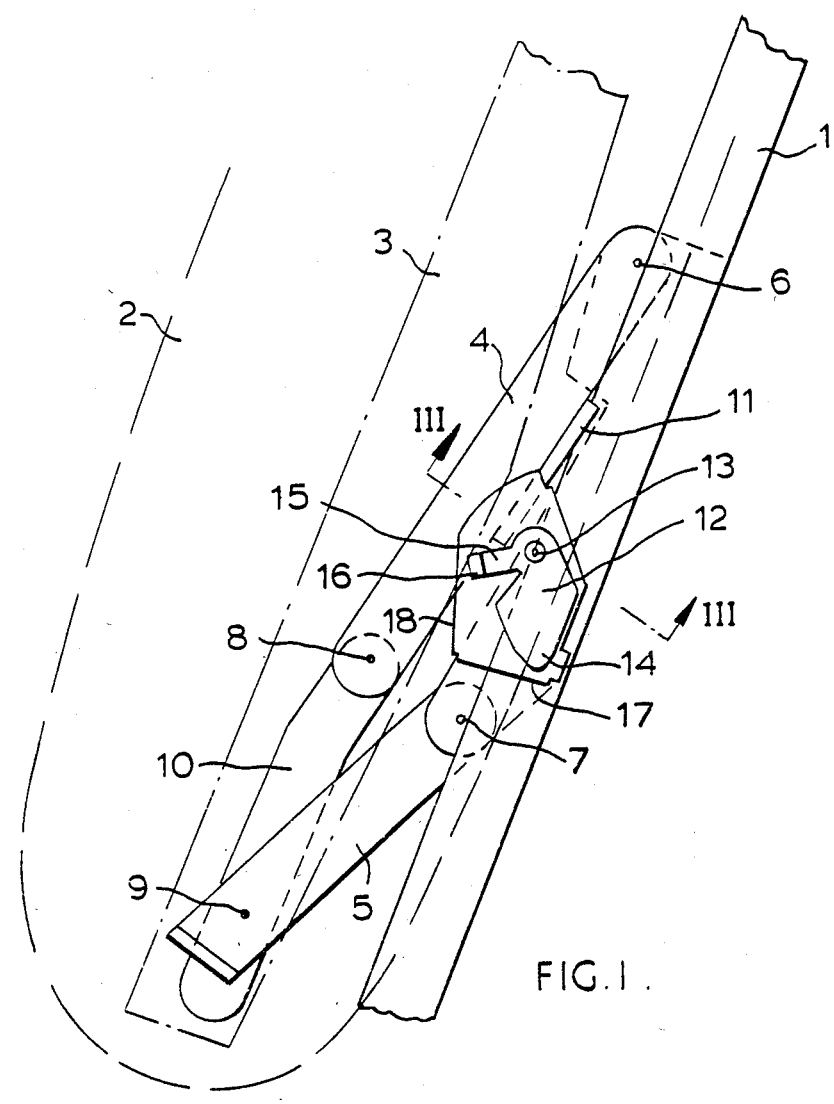
FIG. 1 is a side view of an armrest linkage with a lock according to the invention, the linkage being shown in the position taken up when the armrest is raised.

FIG. 1 shows a seat back 1 which is securely fixed to the car's framework, an armrest 2 shown in phantom lines and, within the armrest, an armrest frame or pan 3 shown in chain-dotted lines. The armrest is connected to the frame by means of two pivoted links, an upper link 4 and a lower link 5. These links are pivoted at 6 and 7, respectively, to the frame 1 and at 8 and 9, respectively, to a strap 10 secured, through the upholstery, to the pan 3.

Figure 3:
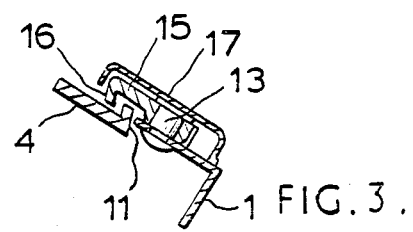
FIG. 3 is a section on the line III—III in FIG. 1 through the linkage and latch, showing the position taken up when the latch is engaged.

The upper link 4 has a rib 11 formed along part of one edge, as can be seen in FIGS. 1 and 3. This rib performs a double function, as will become apparent from the ensuing description.

Also pivoted on the seat back panel 1 is a latch 12. The latch 12 is free to move about its pivot axis 13 and has a pendulum portion 14 and a radially extending arm 15. As can be seen, particularly in FIG. 3, the arm 15 ends in a tooth 16. The latch 12 is mounted inside a cage 17 also fixed to the back panel 1. This cage 17 ensures that the free pivoting movement of the latch 12 is not obstructed by adjacent upholstery.

Figure 2:
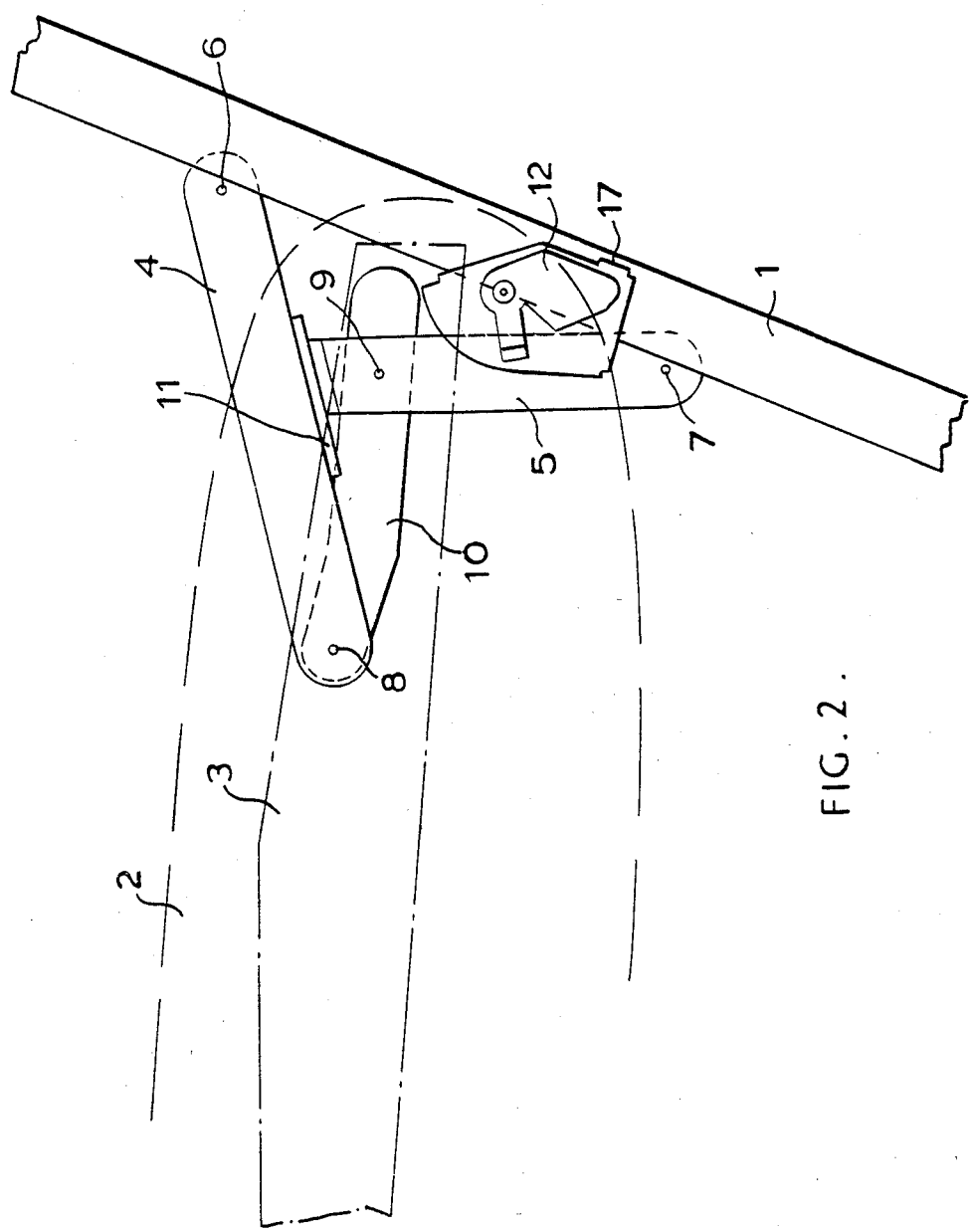
FIG. 2 is a side view, corresponding to FIG. 1, showing the armrest linkage in its lowered position.

FIG. 1 shows the armrest raised and the latch 12 in its inactive position. To lower the armrest from this position, it can simply be pulled forward in the conventional way, without any hindrance from the latch 12. The rib 11 will move upward without contacting the tooth 16 on the latch 12. The position shown in FIG. 2 is then taken up. In its fully lowered position, the armrest is supported horizontally by abutment of a bent-over end of the link 5 against the rib 11. The angle of the bending over of the end of the link 5 is chosen to conform to that of the rib 11, so that a stable support is achieved, without weakening the strength in tension of the link 4.

Returning now to FIG. 1, if the car experiences a sudden deceleration, e.g. in a crash, the inertia of the pendulum portion 14 of the latch 12 will cause the latch to turn clockwise on its pivot 13. This will bring the tooth 16 in front of the rib 11. Since at the same time the armrest will tend to move from its raised position, the tooth 16 and rib 11 will be brought into engagement to prevent any further such movement. The position which these components take up is shown in cross-section in FIG. 3.

If this latched position is reached, the latch can easily be disengaged by pressing the armrest back into its fully raised position, whereupon the latch will drop back into its inactive position as shown in FIG. 1.

To prevent any possibility of the latch jamming against the rib 11, the position of the front wall 18 of the cage 17 is chosen so that the pendulum 14 abuts against it to prevent any further clockwise movement of the latch beyond the position when the cooperating faces of the tooth 16 and rib 11 are parallel to one another.

The linkage which connects the armrest to the seatback is provided on both sides of the armrest. A latch as shown may be provided on either one or both sides, although it is probable that it will only be necessary on one side.

In the event of a crash, there will be a substantial force acting on the latch 12 and on its mounting. For this reason it is desirable to fasten the pivot pin 13 to the strongest available piece of material, in this case the seat back panel 1 rather than the cage 17. The tooth 16 and rib 11 will normally be formed by folding edges of the arm 15 and link 4. If they were both bent at exactly 90°, there would be a danger that the forces acting on them in the event of a crash would cause them to deform whereupon the lock might be released. To avoid this, the edges are bent over at more than a right angle, as can be seen in FIG. 3. Suitably, the included angle between the rib 11 and the link 4 and between the tooth 16 and the arm 15 may be 80°.

To vary the decelerative force required to bring the latch into operation, the weight of the pendulum portion 14 may be increased by thickening it locally. Tests have shown that the latch action should operate at a force of about 0.8 g to 0.7 g.

What is claimed is:

1. An armrest lock for a motor vehicle armrest that is pivotably connected to a motor vehicle seat back through a linkage to permit pivotal movement of the armrest between a raised position and a lowered position, the armrest lock having a detent formed on a portion of the linkage movable during the pivotal movement of the armrest and a latch pivotally mounted on the seat back and including pendulum means for effecting engagement of the latch with the detent when the armrest is in the raised position and the motor vehicle is subjected to certain deceleration, and wherein the linkage comprises a longitudinally spaced pair of links, each pivotally connected at one end to the armrest and at the other end to the seat back and wherein the linkage detent is formed on one of the links and is abuttingly engagable with a turned over portion of the other of the links to support the armrest in the lowered position.

* * * * *